| United States Patent [19] | [11] Patent Number: 4,861,574 |
| Ikeda et al. | [45] Date of Patent: Aug. 29, 1989 |

[54] PROCESS FOR PREPARING CHLOROPOLYSILANES

[75] Inventors: Hiroshi Ikeda, Omiya; Makoto Tsunashima, Tokyo; Akihiko Mieda, Omiya, all of Japan

[73] Assignee: Mitsubishi Kinzoku Kabushiki Kaisha, Tokyo, Japan

[21] Appl. No.: 163,262

[22] Filed: Mar. 2, 1988

[30] Foreign Application Priority Data

Mar. 23, 1987 [JP] Japan .................................. 62-65770

[51] Int. Cl.$^4$ ............................................. C01B 33/08
[52] U.S. Cl. .................................... 423/342; 423/341
[58] Field of Search ......................................... 423/342

[56] References Cited

U.S. PATENT DOCUMENTS 4,585,643  4/1986  Barker .................................. 423/342

FOREIGN PATENT DOCUMENTS

| 0129817 | 8/1982 | Japan | 423/342 |
| 0156319 | 9/1982 | Japan | 423/342 |
| 0161915 | 9/1983 | Japan | 423/342 |
| 0182222 | 10/1984 | Japan | 423/342 |
| 0184720 | 10/1984 | Japan | 423/342 |

OTHER PUBLICATIONS

Hawley's Condensed Chemical Dictionary, 11th edition Sax et al., pp. 231-232.

*Primary Examiner*—John Doll
*Assistant Examiner*—Lori S. Freeman
*Attorney, Agent, or Firm*—Webb, Burden, Ziesenheim & Webb

[57] ABSTRACT

Chloropolysilanes can be produced in high yield without forming solid waste materials by contacting silicon materials with chlorine at a temperature of 140°~300° C. in the presence of copper compound or a mixture thereof.

2 Claims, No Drawings

PROCESS FOR PREPARING CHLOROPOLYSILANES

FIELD OF THE INVENTION

This invention relates to a process for preparing chloropoly-silanes by chlorination of silicon.

With the prosperity of the electronic industry in recent years, demand for silicon semi-conductor materials such as polycrystalline silicon, amorphous silicon, etc. is rapidly increasing. Chloropoly-silanes are today spotlighted as important materials for production of semiconductor silicon.

A chloropolysilane can be made into epitaxial silicon materials by thermal decomposition, and is also used as a source of silica for optical communication technology in which silica with high degree germanium doping is used. Chloropolysilanes can be reduced into silanes represented by the general formula $$Si_nH_{2n+2} \ (n \geq 2)$$

which are used as starting materials for producing semiconductor silicon materials such as polycrystalline silicon and amorphous silicon by thermal decomposition. For instance, disilane $Si_2H_6$ can be far more rapidly deposited as a membrane on a substrate than monosilane $SiH_4$ when they are formed into an amorphous silicon membrane by thermal decomposition, glow discharge decomposition, etc.

Moreover, the membrane made of the former is superior in electric properties. Therefore, a marked increase in demand for chloropolysilanes as semi-conductor materials for solar cells is also expected.

BACKGROUND OF THE INVENTION

Chloropolysilanes have conventionally been produced by chlorination of silicon materials which comprises passing hot chlorine gas through particles of a silicon alloy material such as calcium-silicon, magnesium-silicon, ferrosilicon, etc. or metallic silicon.

However, when chloropolysilanes are prepared by chlorination of the above-mentioned silicide materials, solid by-products such as calcium chloride, magnesium chloride, iron chlorides, etc. are produced. This is undesirable and a commercial process for producing chloropolysilanes without producing solid wastes is desired.

In the case of the reaction of silicon particles and chlorine, no solid waste is produced, but the yield of chloropolysilanes is very low and may be less than 1 mole% on the basis of gram atomic weight of silicon.

Also, in the conventional process, mainly chlorosilanes $SiCl_4$ is produced, and chloropolysilanes $Si_2Cl_6$, $Si_3Cl_8$, etc. are produced only in small amounts as by-products of $SiCl_4$.

We studied the chlorination of silicon particles for production of chloropolysilanes in search of methods in which the yield thereof is high and have found that formation of chloropolysilanes is promoted while the formation of $SiH_4$ is depressed by addition of copper or some copper compounds as catalysts to silicon particles in chlorination.

SUMMARY OF THE INVENTION

This invention provides a process for preparing chloropolysilane $Si_nCl_{2n+2}$ wherein n=2 or 3 comprising contacting chlorine gas with silicon particles mixed with copper or a copper compound or a mixture thereof at a temperature not lower than 140° C. and not higher than 300° C.

The copper compounds used in the process of this invention are not specifically limited if they are copper-containing compounds which do not contaminate silicon particles and gaseous products. However, cuprous chloride CuCl and cupric chloride $CuCl_2$ are preferred since the reaction is chlorination. Cuprous oxide $Cu_2O$ and cupric oxide CuO can be used.

The amount of copper or copper compounds to be added is preferably 0.1~20% by weight as copper on the basis of the used silicon particles. With less than 0.1% by weight, formation of chloropolysilanes is not significantly increased. With addition of more than 20% by weight, the relative amount of silicon particles is reduced and thus the yield of chloropolysilanes does not increase.

The silicon material used in the process of this invention should preferably be as pure as possible, since it is preferred that the formation of solid by-products resulting from impurities be minimized. The purity of the silicon to be used is determined by considering this matter, but generally, it is preferred to use silicon having a purity of 97% or higher.

In the process of the present invention, it is preferred to use silicon particles having an average particle size not smaller than 50 μm and not larger than 2 mm. Particles larger than 2 mm are inferior in activity, and high yield of chloropolysilanes is not achieved. Particles smaller than 50 μm are not desirable, since dust is given forth during the reaction.

Chlorination should preferably be conducted at a temperature not lower than 140° C. and not higher than 300° C. When chlorination is carried out at temperatures lower than 140° C., the reaction rate is impractically low. At reaction temperatures over 300° C., again the yield of chloropolysilanes drops.

The reason why the yield of chloropolysilanes is increased by addition of the copper catalyst is not yet entirely understood. But it is surmised that copper might combine with silicon and it might facillitate formation of silicon polymer. Catalysts other than copper, iron chloride for instance, cannot achieve the effect of the present invention.

By the present invention, the yield of chloropolysilanes, which has been less than 1% on the basis of the atomic amount of silicon, is remarkably increased to not less than 40%.

Advantages of the present invention are as follows: (a) Chloropolysilanes can be produced in high yields without formation of solid waste such as $CaCl_2$, $MgCl_2$ $FeCl_3$, etc., which are unavoidable in the conventional process in which silicon alloy materials are used. (b) Copper and copper compounds used as catalysts remain as chlorides of copper as a result of chlorination of silicon particles. These compounds can be used as the catalyst again. Therefore, there is no problem such that is encountered when silicon alloy materials are chlorinated.

SPECIFIC DISCLOSURE OF THE INVENTION

The invention will now be illustrated by way of working examples, which by no means restrict the scope of the claims.

EXAMPLE 1

To 28.5 g of silicon powder having an average particle diameter of 2μ, 1.5 g of cuprous chloride powder was added. The thoroughly mixed powder was packed into a glass reaction tube having an inner diameter of 4 cm. Chloride gas heated to 200° C. was introduced into the tube at a rate of 50 ml/min for 15 hours for reaction. The reaction product was collected as a condensate by trapping with liquid nitrogen and the unreacted chlorine was absorbed in a sodium chloride solution. The collected reaction product was analyzed by gas chromatography, and it was found that $SiCl_4$, $Si_2Cl_6$ and $Si_3Cl_8$ were obtained respectively in an amount of 51 g, 61 g and 10 g and the yield of chloropolysilanes was 52.6%. About 51. g (18%) of silicon remained unreacted and about 8.4 g (29.5%) of silicon was converted to tetrachlorosilane. The formed chloropolysilanes were separated by fractional distillation.

EXAMPLES 2~5

The procedure of Example 1 was repeated with the catalyst varied. The results are as shown in Table 1.

TABLE 1

| Example | Catalyst | Yield of Chloropolysilanes (%) |
| --- | --- | --- |
| 2 | Cupric chloride | 55.2 |
| 3 | Cuprous chloride | 50.6 |
| 4 | Cupric oxide | 58.9 |
| 5 | Copper | 54.7 |

EXAMPLES 6~8 AND COMPARATIVE EXAMPLES 1~2

The procedure of Example 1 was repeated with the chlorination temperature varied. The results are shown in Table 2.

TABLE 2

| Ex. or Comp. Ex. | Reaction Temp. | Yield of Chloropolysilanes (%) |
| --- | --- | --- |
| Comp. Ex. 1 | 100° C. | 0 |
| Ex. 6 | 140° C. | 47.6 |
| Ex. 7 | 240° C. | 57.1 |
| Ex. 8 | 300° C. | 49.5 |
| Comp. Ex. 2 | 340° C. | 4.8 |

EXAMPLES 9~11 AND COMPARATIVE EXAMPLES 3~4

The procedure of Example 1 was repeated with the amount of the catalyst varied. The results are shown in Table 3.

TABLE 3

| Ex. or Comp. Ex. | Amount (Cu wt %) | Yield of Chloropolysilanes (%) |
| --- | --- | --- |
| Comp. Ex. 3 | 0.01 | 0 |
| Ex. 9 | 0.1 | 48.5 |
| Ex. 10 | 1.5 | 54.7 |
| Ex. 11 | 20 | 50.3 |
| Comp. Ex. 4 | 30 | 10.1 |

COMPARATIVE EXAMPLE 5

The procedure of Example 1 was repeated without a catalyst. Silicon did not react with chlorine and no chloropolysilane was produced.

We claim:

1. A process for preparing chloropolysilane $Si_nCl_{2n+2}$ wherein n=2 or 3 comprising contacting chlorine gas with silicon particles mixed with copper compound or a mixture of a copper compound with copper at a temperature not lower than 140° C. and not higher than 300° C. wherein the copper compound is at least one compound selected from a group consisting of cuprous chloride, cupric chloride, cuprous oxide and cupric oxide.

2. A process described in claim 1, wherein the amount of the copper compound or a mixture of the copper compound with copper mixed with the silicon particles is 0.1~20% by weight as copper.

* * * * *